United States Patent [19]

Schumacher

[11] 4,227,729
[45] Oct. 14, 1980

[54] ROTATABLE RAM BAR APPARATUS AND CARRIER ADAPTER

[76] Inventor: John B. Schumacher, P.O. Box 657, Huron, S. Dak. 57350

[21] Appl. No.: 946,723

[22] Filed: Sep. 28, 1978

[51] Int. Cl.² .............................................. B60R 19/02
[52] U.S. Cl. .............................. 293/145; 224/42.03 B; 403/146
[58] Field of Search ............... 293/145, 115, 118, 142, 293/143; 224/42.03 B, 42.03 R, 42.03 A, 42.04, 42.07; 403/146, 147, 117, 113, 97

[56] References Cited

U.S. PATENT DOCUMENTS

| | | | |
|---|---|---|---|
| 2,177,190 | 10/1939 | Sandberg | 293/145 |
| 2,215,002 | 9/1940 | Jandus | 293/55 |
| 2,469,816 | 5/1949 | Dall | 293/64 |
| 2,587,168 | 2/1952 | Kessler | 403/117 |
| 2,990,212 | 6/1961 | Nicastro | 293/34 |
| 3,103,352 | 9/1963 | Steffen | 269/45 |
| 3,173,717 | 3/1965 | Pears | 293/73 |
| 3,210,110 | 10/1965 | Chieger | 293/73 |
| 3,240,455 | 3/1966 | Swezy | 224/42.03 R |
| 3,342,441 | 9/1967 | Danielson | 248/42 |
| 3,370,878 | 2/1968 | Carr | 293/64 |
| 3,451,710 | 6/1969 | Savell | 293/73 |
| 3,800,967 | 4/1974 | Kosecoff | 224/42.03 B |
| 3,841,544 | 10/1974 | Berger | 224/42.03 B |
| 3,877,622 | 4/1975 | McLain | 224/42.03 B |
| 3,937,451 | 2/1976 | Dipaola | 403/385 |
| 3,968,624 | 7/1976 | Allmendinger | 403/363 |
| 3,972,456 | 8/1976 | Saffold | 224/42.03 B |
| 4,050,616 | 9/1977 | Moson | 224/42.03 B |
| 4,088,253 | 5/1978 | Saffold | 224/42.03 B |

*Primary Examiner*—Robert R. Song
*Attorney, Agent, or Firm*—Finnegan, Henderson, Farabow, Garrett & Dunner

[57] ABSTRACT

A rotatable ram bar apparatus having at least one ram bar assembly for attachment to a vehicle bumper, the assembly including a ram bar, a bracket attachable to the outer side of the vehicle bumper for securing the bar to the bumper, a camming disc attached to the bracket, a mating disc attached to the ram bar, and biasing means for urging the two discs together. The camming disc includes a slot and the mating disc a corresponding key which lock together when the ram bar is in a vertical position extending above and below the vehicle bumper. Inclined guide surfaces terminating in a step are also provided on the camming disc. A removable bicycle carrier may be inserted into the top of the ram bar.

8 Claims, 4 Drawing Figures

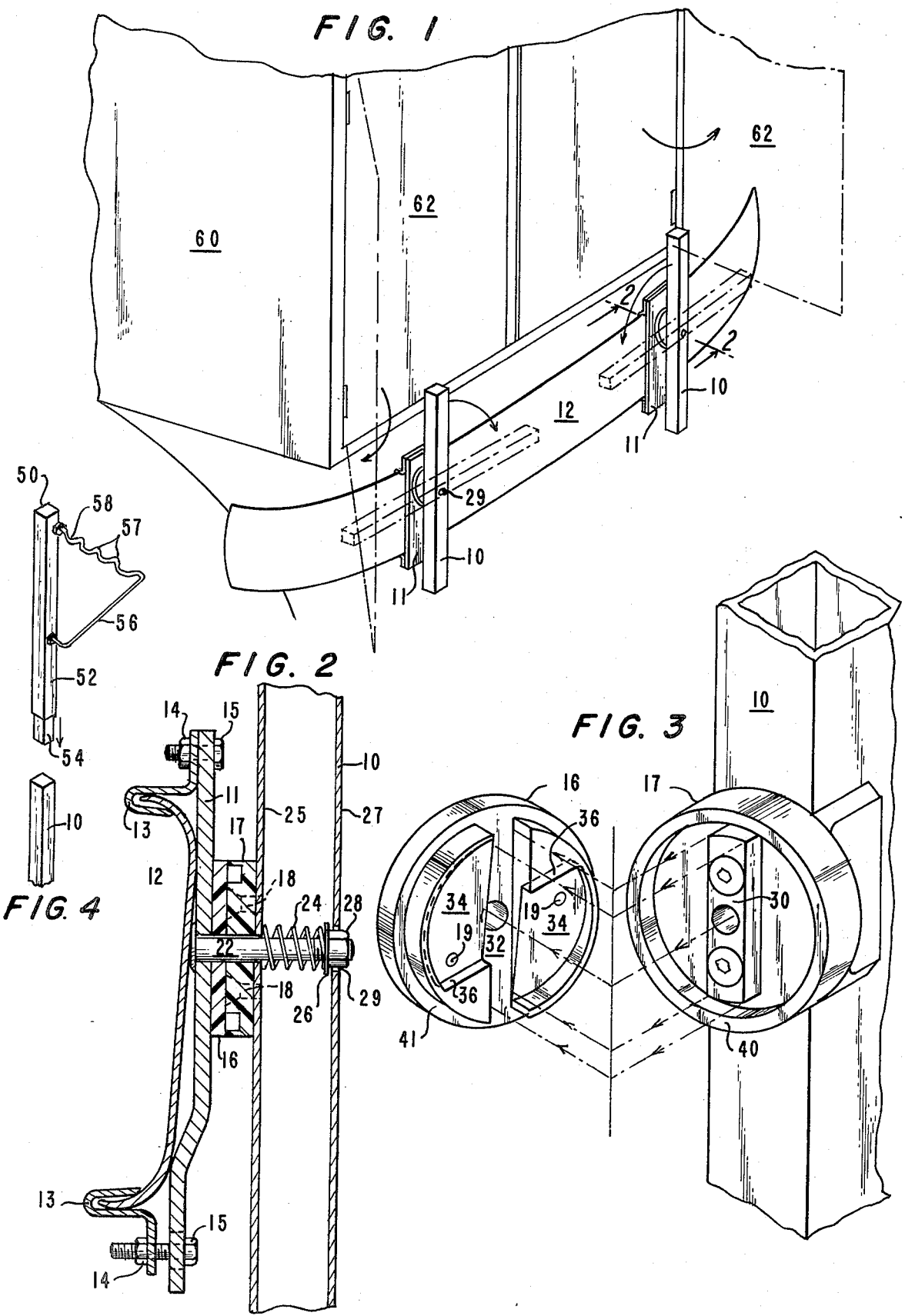

ROTATABLE RAM BAR APPARATUS AND CARRIER ADAPTER

BACKGROUND OF THE INVENTION

This invention relates generally to vehicle accessories and more particularly, to an improved ram bar assembly for wheeled vehicles.

In recent years a great deal of attention has been devoted to the design of vehicle bumpers which provide greater protection for the vehicle occupants. One structure which has been widely used, particularly on light trucks and other heavy duty vehicles, is a pair of vertical bars attached to the front bumper of the vehicle. In addition to providing greater protection for the vehicle, such bars allow the use of the vehicle to push other vehicles, without the danger of damaging the vehicle bumpers or having the bumpers lock together.

The use of such ram bars has been limited to the front of most vehicles, since their presence on the rear bumper of trucks or station wagons would impede the use of rear doors or tailgates. As a result, it has not been possible to achieve the significant degree of protection provided by such ram bars at the rear end of most rear access vehicles. This is particularly significant in the case of vans, since the rear bumper does not extend a significant distance away from the rear wall of such vehicles. Any excessive impact on the rear bumper on such a van could seriously damage the rear doors, and often causes the doors to spring open creating a dangerous condition, and increasing the possibility that children riding in the rear of the vehicle could be thrown out.

In addition, vehicle mounted article carriers such as bicycle racks, which have become particularly popular, interfere with the rear access of a vehicle if mounted on the rear bumper. Removal of such a carrier in order to open rear doors or a tailgate involves a great deal of time and effort.

Accordingly, it is a primary object of this invention to provide an improved ram bar assembly which may be rotated to allow access to the rear of a vehicle.

It is a further object of this invention to provide an improved ram bar assembly which may be easily locked in the vertical position or rotated to a horizontal position.

A still further object of this invention is to provide an improved article carrier for vehicular mounting which may be rapidly and easily removed from the vehicle, allowing ready access to the rear openings.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the foregoing objects, and in accordance with the purpose of the invention, as embodied and broadly described herein, the rotatable ram bar apparatus of this invention has at least one assembly comprising a ram bar, means for securing the bar to the bumper, and means for rotating the bar between a first position wherein the bar extends vertically above and below the vehicle bumper and a second position wherein the bar is substantially parallel to the bumper. Preferably, the securing means includes a bracket attachable to the outer side of a vehicle bumper.

Preferably, the rotating means includes locking means for holding the ram bar in the first position.

It is also preferred that the locking means include a camming disc fixedly mounted to the bracket and a mating disc fixedly mounted to the ram bar. Biasing means are preferably provided to urge the discs together. The mating disc includes a key which engages a corresponding slot in the camming disc when the ram bar is in the first position. The camming disc may include a pair of inclined guide surfaces on the slotted surface thereof for facilitating the removal of the key from the slot. In addition, stop means are preferably provided on the camming disc to limit the rotation of the ram bar beyond the second position. The stop means may comprise a pair of steps at the termination of the guide surfaces for engaging the key to prevent rotation of the bar beyond the second position.

It is also preferred that the ram bar apparatus include a pair of assemblies each having a carrier adapter for supporting an object such as a bicycle to be carried by the vehicle. The adapter preferably comprises bar extension means for attachment to the ram bars and holder means mounted on the extension means to provide the support.

The rotating means may also be applied to many other structures where two elements are required to be rotated with respect to each other between two relative positions.

BRIEF DESCRIPTION OF THE DRAWINGS

The accompanying drawings, which are incorporated in and constitute a part of this specification, illustrate one embodiment of the invention and, together with the description, serve to explain the principles of the invention.

OF THE DRAWINGS

FIG. 1 is a perspective view of a vehicle having rear doors with a pair of ram bar assemblies of the present invention attached to the rear bumper;

FIG. 2 is a sectional view taken along line 2—2 of FIG. 1;

FIG. 3 is an exploded perspective view of the two discs on the right hand assembly of FIG. 1 showing the key and slot construction and the inclined guide surfaces and steps; and FIG. 4 is a perspective view of the carrier adapter.

DESCRIPTION OF PREFERRED EMBODIMENT

Reference will now be made in detail to the present preferred embodiment of the invention, an example of which is illustrated in the accompanying drawings.

Referring now to FIG. 1, it may be seen that the ram bar apparatus is particularly useful on vehicles having rear entry doors or a tailgate. In accordance with the invention, the ram bar apparatus includes at least one assembly having a ram bar 10 and means attachable to the outer side of a vehicle bumper 12 for securing the bar 10 to the bumper 12. As here embodied, the bar 10 has a rectangular cross-section, and is hollow having opposed inner and outer sides 25 and 27, respectively. However, other cross-sectional configurations may be used, and a substantially solid bar could also be used. Any suitable material which provides the necessary strength for the desired impact protection may be used.

Metals such as aluminum or steel, and numerous plastics are commercially available for such use. The bar may also be coated with a plastic material such as Lexan, a trademark of General Electric Company, for thermoplastic carbonate-linked polymers produced by reacting bisphenol A and phosgene.

As here embodied, and as best shown in FIG. 2, the securing means includes a bracket 11 having a pair of hooked fasteners 13 which secure the bracket 11 to the vehicle bumper 12. The fasteners 13 are attached to the bracket 11 at the top and bottom thereof by nuts 14 and bolts 15. The top portion of the bracket 11 may be formed into a hook, to eliminate the need for a top fastener 13. Preferably, the bracket 11 is formed in the specific shape of the vehicle bumper to which it will be attached. Alternatively, the vertical level of the ram bar may be adjusted using the fasteners 13, or suitable wedges (not shown).

In accordance with the invention, the ram bar assembly also includes means for rotating the bar between a first position wherein the bar extends vertically above and below the vehicle bumper 12 and a second position wherein the bar 10 is substantially parallel to the bumper 12. Preferably, the rotating means also includes locking means for holding the ram bar 10 in the first position. As here embodied, and as best shown in FIGS. 2 and 3, the locking means includes a camming disc 16 fixedly mounted to the bracket 11, and a mating disc 17 fixedly mounted to the ram bar 10. The mating disc 17 is preferably attached to the ram bar 10 by means of screws 18 as shown in FIG. 2. Similar screws are preferably provided through holes 19 to secure the camming disc 16 to the bracket 11. The rotating means of the invention may also be separately applied in a variety of other structures wherein one element is required to be rotated with respect to a second element between two relative positions.

In accordance with the invention, biasing means are also provided for urging the discs 16 and 17 together. As here embodied, the biasing means includes a bolt 22 passing through the inner side 25 of ram bar 10, the discs 16 and 17, and the bracket 11. A spring 24 is coiled about the portion of bolt 22 between the inner side 25 and outer side 27 of ram bar 10. A washer 26 and a nut 28 on the end of bolt 22 cause the spring to exert a constant bias to urge the two discs together. The nut 28 protrudes slightly from an opening 29 in the outer side 27 of the ram bar 10. This nut 28 may be tightened or loosened to adjust the tension in spring 24. The nut 28 preferably is not in contact with the outer side 27.

Preferably, the mating disc 17 includes a key 30 and the camming disc 16 includes a corresponding slot 32 which engage when the ram bar 10 is in the vertical position. The camming disc may also include a pair of inclined guide surfaces 34 on the slotted side of the camming disc 16 for facilitating the removal of the key 30 from the slot 32. Each of the guide surfaces 34 is inclined outwardly from the slot 32 so that a moderate outward pressure on the ram bar 10 will allow rotation of the bar.

Preferably, the camming disc 16 also includes stop means for preventing the rotation of the ram bar 10 beyond the horizontal position. As here embodied, the stop means comprises a pair of steps 36 at the termination of the guide surfaces 34, which engage the key 30 to prevent rotation of the bar 10 beyond the horizontal position.

Preferably, the mating disc 17 is also provided with a flange 40 which mates with a complementary shoulder 41 on the camming disc 16. This outer flange 40 aids in maintaining the alignment of the ram bar 10 during rotation.

Preferably, as shown in FIG. 4, the ram bar assembly also includes a carrier adapter 50. In accordance with the invention, the adapter includes bar extension means for attachment to the ram bar, and holder means mounted on the extension means for supporting an object to be carried by the vehicle. As embodied herein, the extension means includes an extender bar 52 having one end 54 dimensioned for insertion into the top portion of the ram bar 10. The holder means includes a brace 56 having a portion 57 extending horizontally from the extender bar 52. Preferably, the horizontal portion 57 includes notch means for securing an object to be carried. As embodied herein, the notch means includes at least one indentation 58 for receiving the tubular frame portion of a bicycle. The indentation 58 may also be fitted with a spring clip device (not shown) for securing a bicycle frame without the need for additional straps or fastening devices. This allows for easier and faster loading and unloading of a bicycle. It is, of course, necessary to utilize a pair of ram bar assemblies to support a normal bicycle frame.

As is readily apparent from FIG. 1, the individual ram bar assemblies may each be easily rotated to a horizontal position out of the path of the rear doors or other rear closure devices of the vehicle on which they are mounted. In FIG. 1, a typical vehicle 60 is supplied with rear doors 62. When the ram bars 10 are in the vertical position, they prevent the door 62 from being opened fully. In order to obtain access to the rear of the vehicle, it is only necessary to exert a moderate pressure outwardly on each of the ram bars 10, and to rotate the bars inwardly to a position parallel to the vehicle bumper 12. Due to the presence of the inclined surfaces 34 on the mating disc 16, only a moderate outward pressure on the ram bar 10 is necessary to overcome the bias of spring 24 and disengage the ends of the key 30 from the slot 32. A slight rotational movement applied to the ram bar 10 in an inward direction causes the key 30 to follow the guide surfaces 34 until the steps 36 are engaged when the ram bar 10 is in the horizontal position.

The ram bar assemblies are intended to be used in pairs, with the guide surfaces 34 designed to allow rotation only in the inward direction as shown by the arrows in FIG. 1. However, alternative designs for the inclined surfaces may be used if rotation in a different direction is desired.

In addition to providing increased vehicular protection upon impact, the ram bars substantially prevent any rear doors from springing open. Thus, the invention provides a significant safety feature which reduces the likelihood that persons riding in the rear of a vehicle will be thrown out on impact.

The carrier adapter 50 may be held in place by the weight of the articles to be carried, or separate securing means may be provided in the lower end 54 of the extender bar 52. The securing means preferably includes a pair of spring loaded balls which fit into corresponding holes in the top of the ram bar 10 (not shown). Other suitable securing means are known to those skilled in the art.

Thus, the ram bar assembly provides increased vehicular impact protection, is simple to install and operate, has a minimum number of moving parts, and may be readily adapted as a carrier for bicycles or other heavy objects. By providing a device combining these features and those disclosed above, the present invention constitutes a significant advance in the art.

It will be apparent to those skilled in the art that various modifications and variations could be made in the structure of the invention without departing from the scope or spirit of the invention.

What is claimed is:

1. A rotatable ram bar apparatus having at least one (1) ram bar assembly for mounting on a vehicle bumper, said assembly comprising:

a ram bar;

means for securing said bar to said bumper; said securing means including a bracket attachable to the outer side of said bumper; and means for rotating said bar between a first position wherein said bar extends vertically above and below said vehicle bumper and a second position wherein said bar is substantially parallel to said bumper, said rotating means including locking means for holding said ram bar in said first position, said locking means including a camming disc fixedly mounted to the bracket, a mating disc fixedly mounted to the ram bar, and biasing means urging said discs together, said mating disc including a key and said camming disc including a corresponding slot, the key engaging said slot when the ram bar is in said first position, and said camming disc including a pair of inclined guide surfaces on the slotted side of said camming disc for facilitating the removal of said key from said slot, and said camming disc including stop means having a pair of steps, each step provided on a respective one of the inclined surfaces on opposite sides of the slot and having oppositely facing abutment surfaces for engagment with a respective one of the opposite longitudinal sides of the key for preventing rotation of said bar beyond said second position.

2. The rotatable ram bar assembly of claim 1 wherein said bar has inner and outer sides and a hollow portion and wherein said biasing means includes a bolt passing through said discs, said bracket and said inner side, and a spring coiled about said bolt within the hollow portion of said bar.

3. The rotatable ram bar assembly of claim 2 also including a carrier adapter, said adapter comprising bar extension means for attachment to said ram bar, and holder means mounted on said extension means for supporting an object to be carried by said vehicle.

4. The rotatable ram bar assembly of claim 3 wherein at least the top portion of said ram bar is hollow and said extension means includes an extender bar having one end dimensioned for insertion into the hollow portion of said ram bar at the top end thereof.

5. The rotatable ram bar assembly of claim 4 wherein said holder means includes a brace, at least a portion of said brace extending horizontally from said extender bar.

6. The rotatable ram bar assembly of claim 5 wherein the horizontal portion of said brace includes notch means for securing an object to be carried.

7. The rotatable ram bar assembly of claim 6 wherein said notch means includes at least one indentation dimensioned for receiving an object having a tubular frame portion.

8. The rotatable ram bar apparatus of claim 3, 4, 5, 6 or 7 including a pair of said assemblies mounted in spaced apart relation on said vehicle bumper for supporting two portions of an object.

\* \* \* \* \*